(12) United States Patent
Ishii et al.

(10) Patent No.: US 9,667,080 B2
(45) Date of Patent: May 30, 2017

(54) CHARGING DEVICE

(71) Applicant: PANASONIC INTELLECTUAL PROPERTY MANAGEMENT CO., LTD., Osaka (JP)

(72) Inventors: Toshiki Ishii, Kanagawa (JP); Takuya Hirai, Kanagawa (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 130 days.

(21) Appl. No.: 14/429,412

(22) PCT Filed: Sep. 19, 2013

(86) PCT No.: PCT/JP2013/005536
§ 371 (c)(1),
(2) Date: Mar. 19, 2015

(87) PCT Pub. No.: WO2014/045580
PCT Pub. Date: Mar. 27, 2014

(65) Prior Publication Data
US 2015/0236542 A1    Aug. 20, 2015

(30) Foreign Application Priority Data

Sep. 19, 2012  (JP) .................................. 2012-205677

(51) Int. Cl.
*H02J 7/00* (2006.01)
(52) U.S. Cl.
CPC .................. *H02J 7/0052* (2013.01)

(58) Field of Classification Search
CPC ....... Y02E 60/12; H02J 7/0042; H02J 7/0045; H01M 10/46; H01M 10/44
(Continued)

(56) References Cited

U.S. PATENT DOCUMENTS 3,590,710 A  *  7/1971  Uno ....................... G03B 17/42
                                                        396/265
6,160,455 A     12/2000  French
(Continued)

FOREIGN PATENT DOCUMENTS

CN      1379867 A      11/2002
JP      10-145978 A    5/1998
(Continued)

OTHER PUBLICATIONS

Extended European Search Report for Application No. 13838654.5-1805/2899862 dated Aug. 28, 2015.
(Continued)

*Primary Examiner* — Arun Williams
(74) *Attorney, Agent, or Firm* — Pearne & Gordon, LLP

(57) ABSTRACT

The purpose of the invention is to stabilize the output of a charging device by removing noise components back to the output side of the charging device. The charging device (100) charges a secondary battery (30) by using power supplied from an external power supply (20). A charging unit (102) has a primary coil (150) and a secondary coil (151), converts the power supplied from the external power supply (20) into a charging power, and supplies the charging power to the secondary battery (30). A noise removing unit (103) removes noise components included in the charging power that is supplied to the secondary battery (30) by the charging unit (102).

4 Claims, 2 Drawing Sheets

(58) Field of Classification Search
USPC .......................................................... 320/107
See application file for complete search history.

(56) References Cited

U.S. PATENT DOCUMENTS

| | | | | |
|---|---|---|---|---|
| 8,593,837 | B2* | 11/2013 | Hong | G03G 15/5004 320/166 |
| 2002/0141208 | A1* | 10/2002 | Nanbu | H02J 7/025 363/37 |
| 2008/0238364 | A1* | 10/2008 | Weber | H02J 7/025 320/108 |
| 2009/0002903 | A1* | 1/2009 | Uchida | B60L 3/00 361/49 |
| 2010/0259227 | A1 | 10/2010 | Gale et al. | |
| 2011/0057611 | A1* | 3/2011 | Nakaso | B60K 6/445 320/109 |
| 2013/0221895 | A1 | 8/2013 | Kanda et al. | |
| 2014/0084828 | A1* | 3/2014 | Yamamoto | H02M 1/32 318/400.22 |

FOREIGN PATENT DOCUMENTS

| | | |
|---|---|---|
| JP | 2008-193788 A | 8/2008 |
| JP | 2009-240016 A | 10/2009 |
| KR | 2012-0091910 A | 8/2012 |
| WO | 2012/070117 A1 | 5/2012 |

OTHER PUBLICATIONS

International Search Report for Application No. PCT/JP2013/005536 dated Oct. 15, 2013.
English Translation of Search Report issued in Chinese Patent Application No. 2013800485398 dated Sep. 5, 2016.

* cited by examiner

CHARGING DEVICE

TECHNICAL FIELD

The present invention relates to a charging apparatus that charges a storage battery using power supplied from an external power source.

BACKGROUND ART

Conventionally, vehicle-mounted charging apparatuses have been known in which a Y-capacitor for removing noise is inserted into an AC input circuit provided between a power source connector to be connected to an external power source and a charger (e.g., PTL 1). The vehicle-mounted charging apparatus disclosed in PTL 1 can remove various noise components included in AC power supplied from the external power source by providing the Y-capacitor.

CITATION LIST

Patent Literature

PTL 1
Japanese Patent Application Laid-Open No. 2009-240016

SUMMARY OF INVENTION

Technical Problem

However, the charging apparatus disclosed in PTL 1 does not have a configuration that removes a noise component between the charger and the battery. Accordingly, there is a possibility, in the charging apparatus in PTL 1, that an L-component and a C-component included in a storage battery mounted on a vehicle and an L-component and a C-component included in wiring connecting the charger to the storage battery may be mixed into an output side of the charger, as noise components. In this case, the charging apparatus disclosed in PTL 1 has a problem of unstable output.

An object of the present invention is to provide a charging apparatus capable of stabilizing the output of the charging apparatus by removing a noise component that is mixed into the output side of the charging apparatus.

Solution to Problem

The charging apparatus according to the present invention is a charging apparatus that charges a storage battery using power supplied from an external power source, the charging apparatus including: a charging section that converts power supplied from the external power source into charging power and supplies the charging power to the storage battery; and a noise removal section that removes a noise component included in the charging power to be supplied to the storage battery by the charging section.

Advantageous Effects of Invention

According to the present invention, the output of the charging apparatus can be stabilized by removing a noise component that is mixed into the output side of the charging apparatus.

DESCRIPTION OF EMBODIMENT

Figure 1:
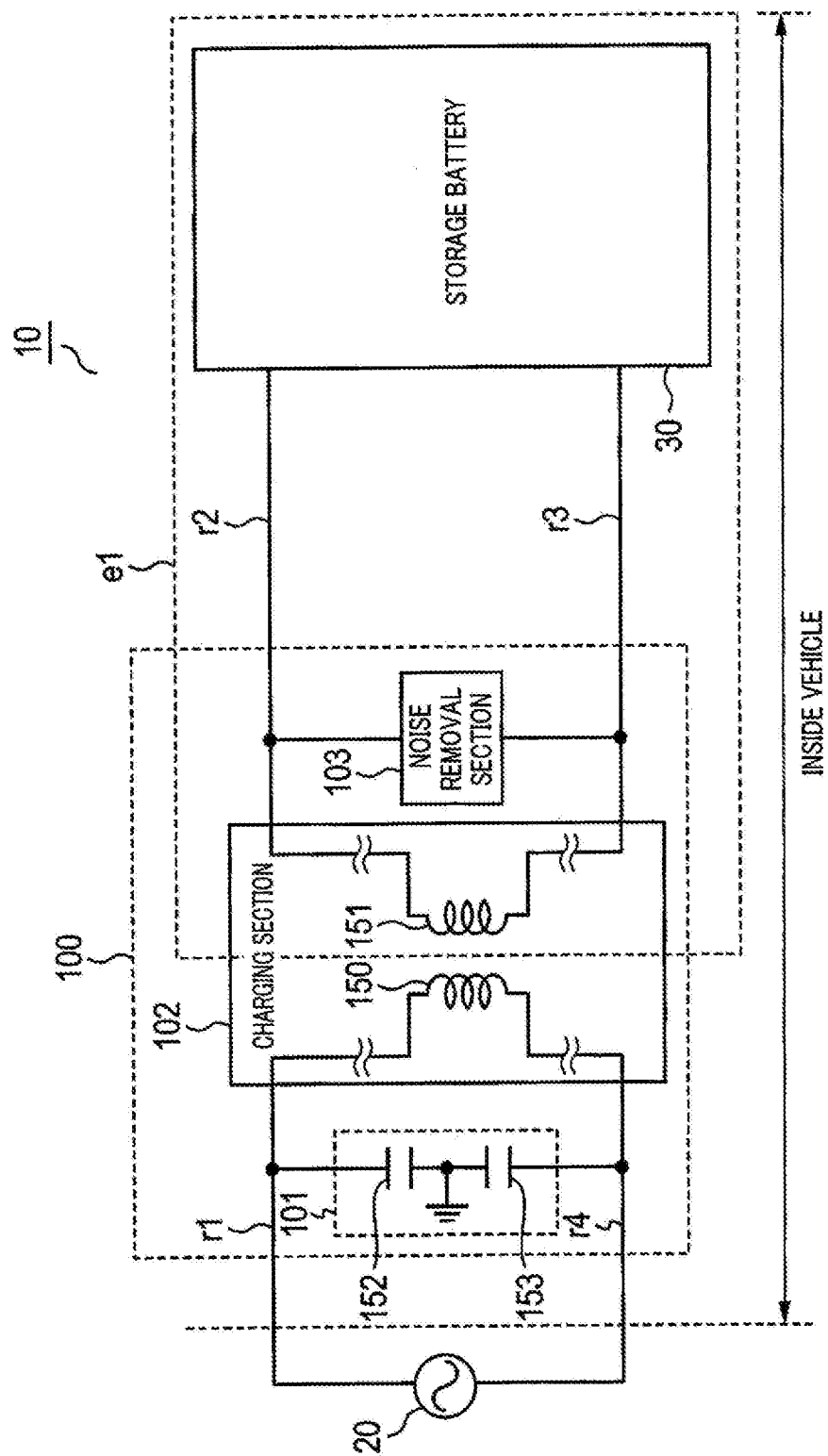
FIG. 1 is a diagram illustrating a configuration of a charging system in Embodiment 1 of the present invention.

Hereinafter, embodiments of the present invention will be described with reference to the accompanying drawings.

(Embodiment 1)
<Configuration of Charging System>
The configuration of charging system 10 in Embodiment 1 of the present invention will be described using FIG. 1.

Charging system 10 is composed mainly of external power source 20, storage battery 30, and charging apparatus 100.

External power source 20 is a commercially available power source, and supplies AC power to charging apparatus 100 when external power source 20 is connected to charging apparatus 100. External power source 20 is connected to charging apparatus 100 through high potential input charging path r1 and low potential input charging path r4. External power source 20 is, for example, a power source of a charging stand for charging storage battery 30 mounted on an automobile that runs on power from the storage battery, such as HEV (Hybrid Electric Vehicle), PEV (Plug-in Electric Vehicle) or EV (Electric Vehicle) (hereinafter, described as "electric automobile"). It is noted that external power source 20 is connected to charging apparatus 100 by connecting a charging plug (not illustrated) on external power source 20 side to a charging socket (not illustrated) of charging apparatus 100.

Storage battery 30 stores power supplied from external power source 20 via charging apparatus 100. Storage battery 30 is connected to charging apparatus 100 through high potential output charging path r2 and low potential output charging path r3. Storage battery 30 is mounted on electric automobiles, for example. In addition, storage battery 30 supplies stored power to a motor mounted on electric automobiles to drive the motor, for example.

Charging apparatus 100 charges storage battery 30 using the power supplied from external power source 20. It is noted that the details of the configuration of charging apparatus 100 will be described hereinafter.

Charging apparatus 100 and storage battery 30 are mounted on electric automobiles, for example.

<Configuration of Charging Apparatus>
The configuration of charging apparatus 100 according to Embodiment 1 of the present invention will be described using FIG. 1.

Charging apparatus 100 is composed mainly of noise removal section 101, charging section 102, and noise removal section 103.

Noise removal section 101 is connected in parallel to input charging path r1 and input charging path r4 at a position closer to external power source 20 than charging section 102. Noise removal section 101 has Y-capacitors 152 and 153. Noise removal section 101 is connected to the ground between Y-capacitors 152 and 153. Noise removal section 101 removes a noise component included in AC power to be supplied to charging section 102 from external power source 20.

Charging section 102 has primary coil 150 and secondary coil 151. Charging section 102 converts power supplied from external power source 20 into charging power using primary coil 150 and secondary coil 151, and supplies the converted charging power to storage battery 30. Primary coil 150 receives power supplied from external power source 20. Secondary coil 151 is electromagnetically coupled to primary coil 150 when primary coil 150 receives the power supplied from external power source 20. Secondary coil 151 supplies, as charging power, power induced by being coupled electromagnetically to primary coil 150 to storage battery 30. The charging power is transmitted between charging section 102 and storage battery 30 through output charging path r2 and output charging path r3.

When external power source 20 is a universal power source such as a household power outlet, charging section 102 converts AC power supplied from external power source 20 into DC power, and supplies, as charging power, the converted DC power to storage battery 30.

Noise removal section 103 is provided between charging section 102 and storage battery 30. Noise removal section 103 is connected in parallel to output charging path r2 and output charging path r3. Noise removal section 103 removes a noise component included in the charging power to be supplied to storage battery 30 from charging section 102. Specifically, noise removal section 103 removes a noise component included in the charging power to be supplied to storage battery 30 from secondary coil 151.

Noise removal section 103 is provided for removing unremovable noise caused by allowing storage battery 30, noise removal section 103, secondary coil 151, output charging path r2, and output charging path r3 to be in an electrically floating state. It is noted that the details of the configuration of noise removal section 103 will be described hereinafter.

Here, area e1 including storage battery 30, noise removal section 103, secondary coil 151, output charging path r2, and output charging path r3 is insulated from the periphery. That is, area e1 is in an electrically floating state. The reason why area e1 is made to be in an electrically floating state is because a storage battery mounted on an electric automobile stores higher voltage power than a storage battery mounted on a conventional gasoline-powered automobile; the electrically floating state prevents a user who touches a high potential portion of the storage battery and, for example, the vehicle body from having an electric shock. However, when area e1 is made to be in an electrically floating state, the storage battery and each apparatus included in area e1 cannot be connected to the stable ground (e.g., vehicle body). As a result, noise cannot be released to the ground sufficiently, so that the noise is mixed into the output side of the charging section. Accordingly, in charging apparatus 100 of the present embodiment, noise can be surely removed by providing noise removal section 103 even when area e1 is made to be in an electrically floating state.

<Configuration of Noise Removal Section>

Figure 2:
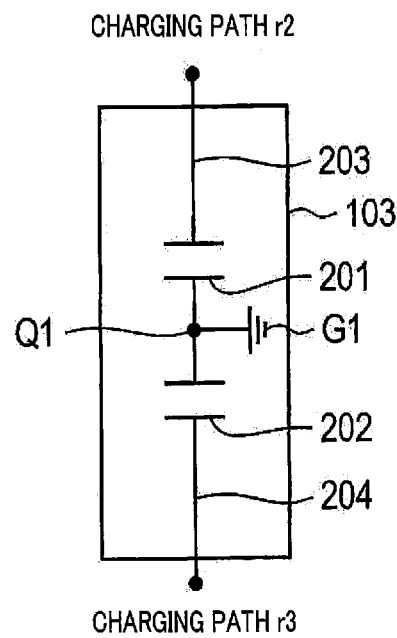
FIG. 2 is a diagram illustrating a configuration of a noise removal section in Embodiment 1 of the present invention.

The configuration of noise removal section 103 in Embodiment 1 of the present invention will be described using FIG. 2.

Noise removal section 103 has Y-capacitors 201 and 202.

Y-capacitor 201 is inserted in series into connecting line 203 that connects output charging path r2 to ground G1.

Y-capacitor 202 is inserted in series into connecting line 204 that connects output charging path r3 to ground G1.

Middle point Q1 between Y-capacitors 201 and 202 is connected to ground G1. Ground G1 is, for example, a vehicle body (not illustrated).

For Y-capacitors 201 and 202, Y-capacitors having a capacitance value capable of removing noise that varies depending on the length of the wiring of output charging path r2 or on the length of the wiring of output charging path r3 should be selected. The reason for the selection is because an L-component or a C-component, which constitutes noise, of output charging path r2 or of output charging path r3 varies depending on the length of the wiring of output charging path r2 or on the length of the wiring of output charging path r3.

<Effect of Embodiment 1>

In the present embodiment, providing noise removal section that removes a noise component included in charging power to be supplied to the storage battery by the charging section makes it possible to remove a noise component that is mixed into the output side of the charging apparatus. Thus, according to the present embodiment, the output of the charging apparatus can be stabilized.

Further, according to the present embodiment, providing the noise removal section that removes a noise component included in charging power to be supplied to the storage battery by the charging section makes it possible to surely remove unremovable noise caused by allowing area e1 including storage battery 30, noise removal section 103, secondary coil 151, output charging path r2, and output charging path r3 to be in an electrically floating state.

(Embodiment 2)

The charging system and charging apparatus in Embodiment 2 of the present invention have the same configurations as those in FIG. 1 except that noise removal section 303 is provided in place of noise removal section 103, and thus the description therefor will be omitted.

<Configuration of Noise Removal Section>

Figure 3:
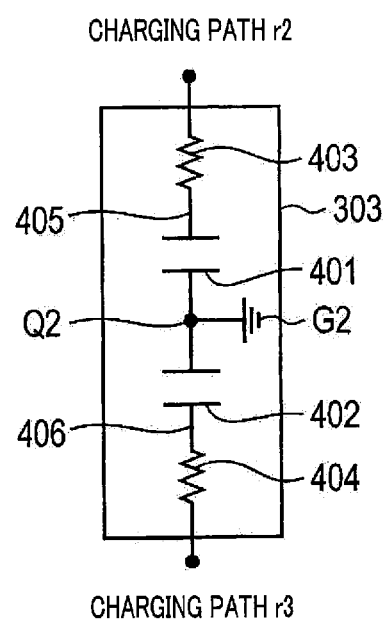
FIG. 3 is a diagram illustrating a configuration of a noise removal section in Embodiment 2 of the present invention.

The configuration of noise removal section 303 in Embodiment 2 of the present invention will be described using FIG. 3.

Noise removal section 303 has Y-capacitors 401 and 402, and resistors 403 and 404.

Y-capacitor 401 is inserted in series into connecting line 405 that connects output charging path r2 to ground G2.

Y-capacitor 402 is inserted in series into connecting line 406 that connects output charging path r3 to ground G2.

Resistor 403 is inserted in series into connecting line 405 between output charging path r2 and Y-capacitor 401. Resistor 403 is provided for preventing a current from being supplied abruptly to Y-capacitor 401.

Resistor 404 is inserted in series into connecting line 406 between output charging path r3 and Y-capacitor 402. Resistor 404 is provided for preventing a current from being supplied abruptly to Y-capacitor 402.

Middle point Q2 between Y-capacitors 401 and 402 is connected to ground G2.

Ground G2 is, for example, a vehicle body (not illustrated).

For Y-capacitors 401 and 402, Y-capacitors having a capacitance value capable of removing noise that varies depending on the length of the wiring of output charging path r2 or on the length of the wiring of output charging path r3 should be selected. The reason for the selection is the same as described above for Embodiment 1.

<Effect of Embodiment 2>

In the present embodiment, a resistor is inserted in series into the line between the Y-capacitor and the output charging path in noise removal section 303, thereby making it possible to prevent a current from being supplied abruptly to the Y-capacitor. Thus, according to the present embodiment, in addition to the above-described effects of Embodiment 1, it becomes possible to prevent noise from occurring due to abrupt supply of a current to the Y-capacitor, and to prevent the output of the charging apparatus from being unstable as a result of noise, which occurred at noise removal section 303, being mixed into the output side of the charging section.

<Modification Common to All Embodiments>

While, in the above-described Embodiments 1 and 2, charging apparatus 100 is provided in an electric automobile, charging apparatus 100 can be provided in a vehicle other than an electric automobile or an apparatus, other than a vehicle, on which a storage battery is mounted.

Further, while in the above-described Embodiments 1 and 2, noise being mixed into the output side of the charging section is removed using the Y-capacitor, the noise being mixed into the output side of the charging section can be removed by other methods such as those using an X-capacitor other than the Y-capacitor or a common coil.

The disclosure of Japanese Patent Application Number 2012-205677 filed on Sep. 19, 2012 including the specification, drawings and abstract is incorporated herein by reference in its entirety.

INDUSTRIAL APPLICABILITY

The charging apparatus according to the present invention is suitable for charging a storage battery using power supplied from an external power source.

REFERENCE SIGNS LIST

10 Charging system
20 External power source
30 Storage battery
100 Charging apparatus
101, 103 Noise removal section
102 Charging section
150 Primary coil
151 Secondary coil
152, 153 Y-capacitor
e1 Area
r1 Input charging path
r2 Output charging path
r3 Output charging path
r4 Input charging path

The invention claimed is:

1. A charging apparatus that charges a storage battery using power supplied from an external power source, the charging apparatus comprising:
    a charging section that converts power supplied from the external power source into charging power and supplies the charging power to the storage battery;
    a pair of output charging paths that transmit the charging power to the storage battery from the charging section; and
    a noise removal section that removes a noise component included in the charging power to be supplied to the storage battery by the charging section, wherein:
    the charging section includes a primary coil that receives power supplied from the external power source, and a secondary coil that is in an electrically floating state together with the storage battery and supplies, as the charging power, power induced by being coupled electromagnetically to the primary coil to the storage battery; and
    the noise removal section includes a Y-capacitor provided at a connecting line that connects each of the pair of output charging paths to a ground, and removes a noise component included in the charging power to be supplied to the storage battery by the secondary coil.

2. The charging apparatus according to claim 1, wherein:
    the noise removal section includes a resistor inserted in series into the connecting line between the Y-capacitor and the pair of output charging paths.

3. A vehicle including the charging apparatus according to claim 1.

4. The charging apparatus according to claim 1, wherein:
    the Y-capacitor has a capacitance value capable of removing the noise component that varies depending on a length of the wiring of at least one of the output charging paths.

* * * * *